United States Patent [19]

Nowell

[11] E Re. 30,151

[45] Reissued Nov. 20, 1979

[54] ADJUSTABLE BED-FRAME

[75] Inventor: Richard A. Nowell, Carlsbad, Calif.

[73] Assignee: Harris-Hub Co., Inc., Harvey, Ill.

[21] Appl. No.: 906,769

[22] Filed: May 16, 1978

Related U.S. Patent Documents

Reissue of:

[64] Patent No.: 4,078,270
Issued: Mar. 14, 1978
Appl. No.: 768,331
Filed: Feb. 14, 1977

[51] Int. Cl.[2] ..... A47C 19/04

[52] U.S. Cl. ..... 5/181; 5/201

[58] Field of Search ..... 5/82, 114, 119, 181-185, 5/200, 201, 207, 285, 354; 403/107, 108

[56] References Cited

U.S. PATENT DOCUMENTS

| | | | |
|---|---|---|---|
| 1,035,765 | 8/1912 | Ballard | 5/183 |
| 1,230,446 | 6/1917 | Thirlwall | 5/354 |
| 1,433,741 | 10/1922 | Parker | 5/119 X |
| 2,880,427 | 4/1959 | Atwood | 5/82 |
| 3,795,022 | 3/1974 | Harris | 5/181 |
| 3,952,345 | 4/1976 | Spitz | 5/207 |
| 4,019,211 | 4/1977 | Spitz | 5/181 |

*Primary Examiner*—Casmir A. Nunberg
*Attorney, Agent, or Firm*—Dressler, Goldsmith, Clement, Gordon & Shore, Ltd.

[57] ABSTRACT

A pair of improved adjustable cross-frame members are incorporated with a pair of side frame members to form a bed frame readily adjustable to a wide variety of widths. Each improved cross-frame member has a first and second elongated elements, each of which is pivotably connected to respective side members in a standard manner. The first element is provided with a pawl mounted near its free end and the second element is provided with a pluralitv of teeth. The teeth are shaped to allow for easy movement when the side frame members are moved toward each other and to allow for resistance when the side frame members are being pulled apart from each other.

12 Claims, 7 Drawing Figures

ADJUSTABLE BED-FRAME

Matter enclosed in heavy brackets [ ] appears in the original patent but forms no part of this reissue specification; matter printed in italics indicates the additions made by reissue.

FIELD OF THE INVENTION

This invention relates to an adjustable bed frame and, more particularly, to a pair of improved adjustable cross or transverse members for the bed frame.

BACKGROUND OF THE INVENTION

In U.S. Pat. No. 3,744,068, for example, a well-known type of adjustable bed frame is disclosed. A problem has long existed in the art because frame members of this type have not provided positive interlocking engagement between sliding elements which make up the cross or transverse frame members without the need of a large number of fasteners. In addition, the assembling and disassembling of the elements is time consuming and complicated because if, by chance, the width has been assembled too narrow or too wide for the particular box spring and mattress, the box spring and mattress should be completely removed before any readjustment could be made.

OBJECTS OF THE INVENTION

An object of this invention is to provide a simple, economical means for fastening together elements of a transverse member of a bed frame while still allowing for adjustments.

Another object of this invention is to provide an improvement in the adjustment fastening means which allows easy movement, in the narrowing direction, of a bed frame and resistance in the widening direction.

These and other objects and features of advantage will be better understood after studying the following detailed description of the preferred embodiment of my invention, together with the appended drawing.

DETAILED DESCRIPTION OF THE DRAWING

Figure 1:
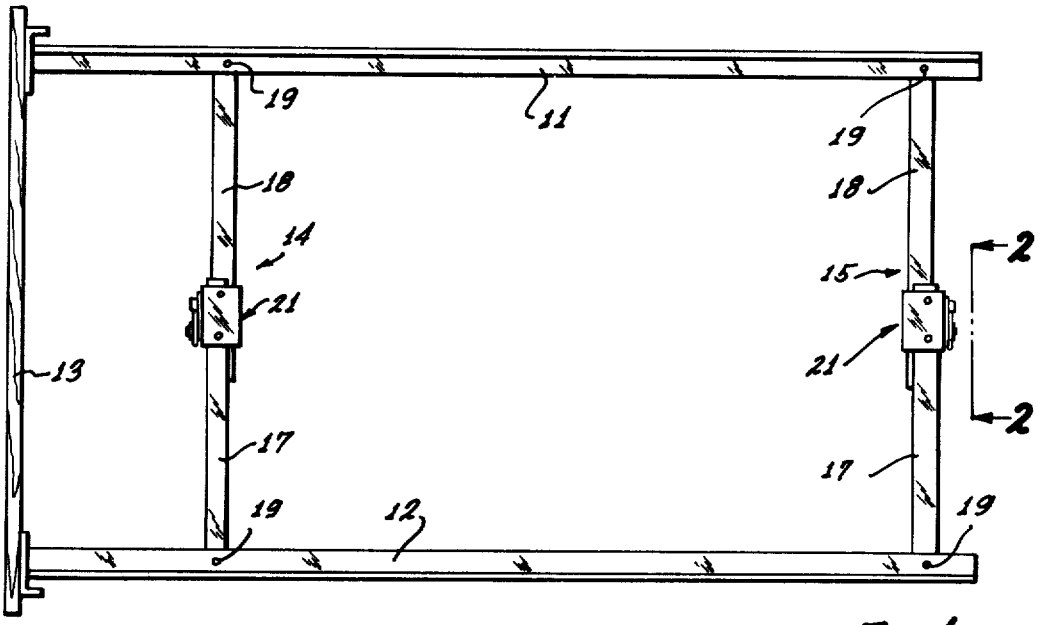
FIG. 1 is a plan view of a typical bed frame on which my novel means is incorporated.

Referring to FIG. 1, in particular, a standard bed frame is shown in plan view and comprises a pair of spaced parallel side frame members 11 and 12 which are attached to a headboard 13. The side frame members are spanned by a pair of cross or transverse frame members 14 and 15. Normally, the side frame members 11 and 12 are each made of one section of angle iron with one leg disposed vertically so that a recessed support is provided for a box spring and mattress (not shown). The cross members 14 and 15 are, in this embodiment, each respectively made of two angle iron elements 17 and 18 wherein elements 18 are pin-mounted to member 11 by suitable pins 19 and elements 17 are pin-mounted to member 12, also by suitable pins 19.

As shown in the drawing, elements 17 and 18 overlap and are held together by some fastening means. However, I have shown elements 17 and 18 held together by my novel means 21 which is schematically shown in FIG. 1, and shown in detail in FIGS. 2, 3, and 4.

Figure 2:
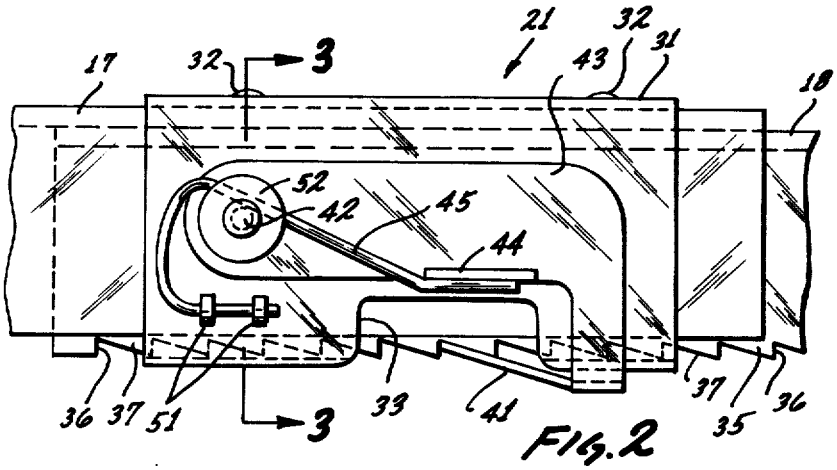
FIG. 2 is a partial elevation taken on line 2—2 of FIG. 1, in the direction of the arrows, showing one embodiment of my invention.
Figure 3:
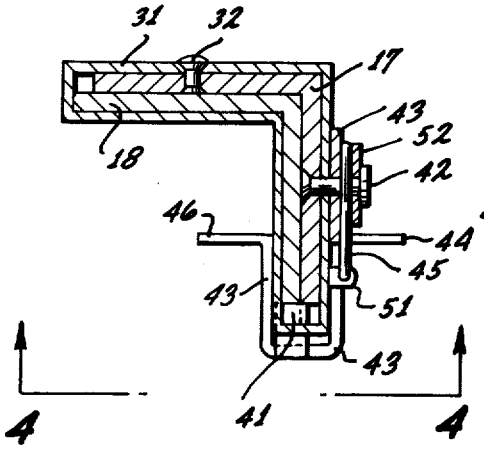
FIG. 3 is a section taken on line 3—3 of FIG. 2, in the direction of the arrows.
Figure 4:
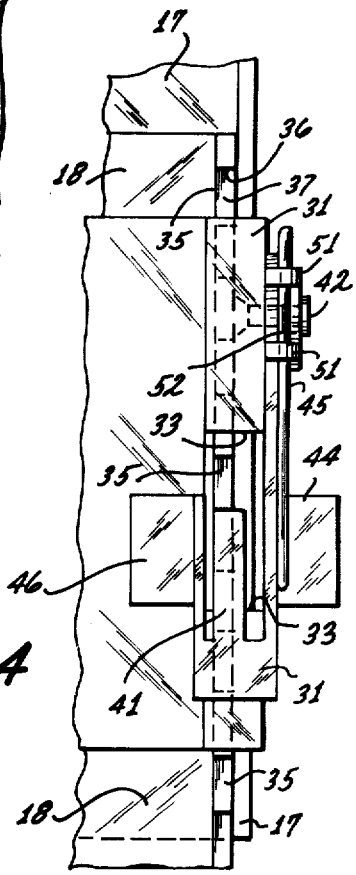
FIG. 4 is a partial bottom view taken on line 4—4 of FIG. 3, in the direction of the arrows.

Referring to FIGS. 2, 3, and 4, I will describe an embodiment of my novel fastening means. The angle shape of elements 17 and 18 are more clearly shown in FIG. 3, wherein element 17 is disposed outside of element 18. Near the end of element 17 is mounted a sleeve 31 which has an L-shaped cross-sectional shape, as shown in FIG. 3, to match the shape of the angle members 17 and 18. Sleeve 31 is conveniently mounted to element 17 by, for example, a rivet 32. Elements 17 and 18 both extend through the sleeve 31. Sleeve 31 is provided with a cutout 33, as shown in FIG. 2 at its lower side or portion, thereby, exposing the lower ends of the vertical legs on both elements 17 and 18. As shown more clearly in FIG. 2, element 18 is provided with a series of teeth 35, each formed by a vertical face 36 and a sloping face 37, for reasons that will become apparent hereinafter. Engaging the teeth 35 is a pawl 41 pivotably mounted to sleeve 31 by a pin 42, and an arm 43 to which the pawl 41 is attached. A tab 44 is also attached to arm 43, as shown, to provide a place for a person to operate the pawl 41. A wire spring 45, which is attached to sleeve 31 by eyelets 51, urges the pawl 41 against the teeth 35, since the other end of the spring 45 is disposed under the tab 44. A washer 52 holds the spring 45 in place. Another tab 46 could be placed opposite tab 44 to provide another place to operate the pawl 41.

My novel means operates in the following manner: The bedframe is sold and stored in a suitable container with elements 17 and 18 separated, and each respectively folded against the side members to which each element is attached. One then rotates each element until they are disposed substantially perpendicular to the respective side member. Each element 18 is inserted into a respective sleeve 31 and, since the shape of the teeth 35 are as they are shown, element 18 freely moves through the sleeve, causing a ratchet action between the pawl 41 and the teeth 35. Since the pawl is being urged against the teeth 35, reverse motion of element 18 is not possible unless one grasps tab 44 or tab 46 and pivots the arm 43 downward, as viewed in FIG. 2. The teeth 35 are now free of the pawl and element 18 could be withdrawn from sleeve 31.

One can now see one big advantage in using my novel means. This is, after each element 18 is initially inserted into a respective sleeve 31, one does not need to measure the width of the box spring (not shown) and then bring the space in between the vertical legs of respective side members 11 and 12 to that distance. All one needs to do is place the box spring on top of the bed frame and push the side members 11 and 12 together until the vertical legs thereon close in on the box spring. The spacing is automatically locked and one can readily see any movement of the bed frame after assembly would not cause the spacings to open.

Figure 5:
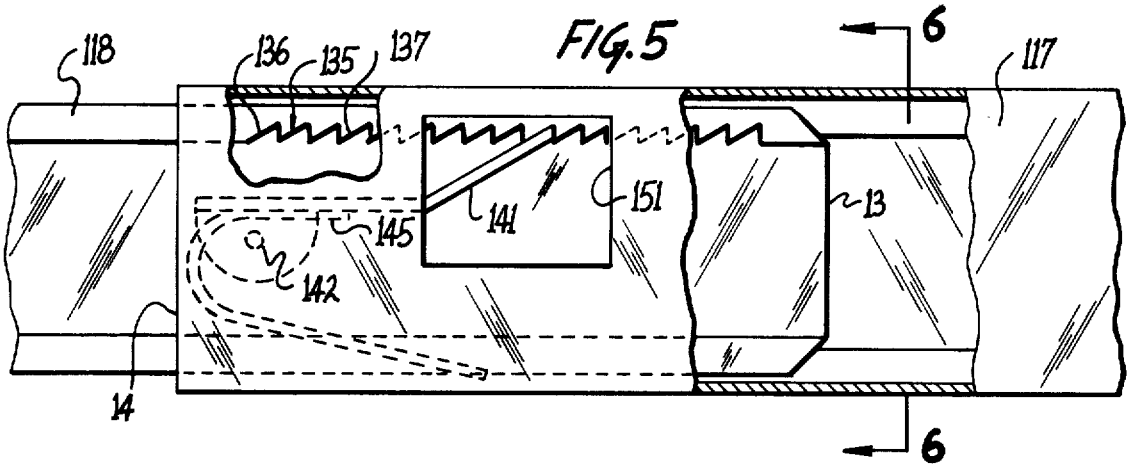
FIG. 5 is a partial elevation similar to FIG. 2, showing another embodiment of my invention.
Figure 6:
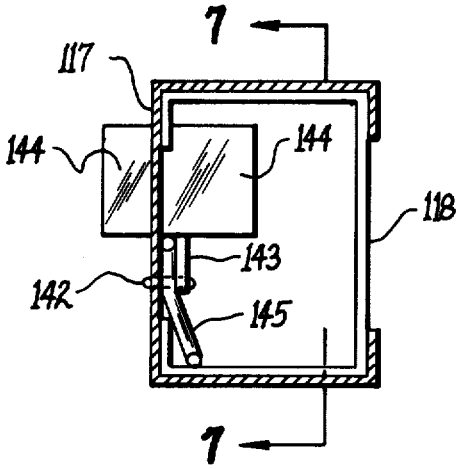
FIG. 6 is a section taken on line 6—6 of FIG. 5 in the direction of the arrows.
Figure 7:
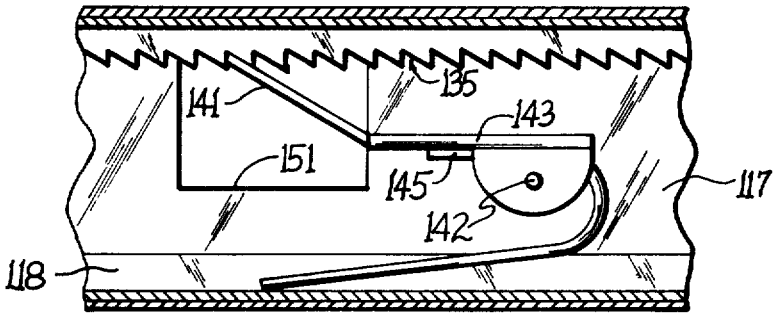
FIG. 7 is a section taken on line 7—7 in the direction of the arrows.

Referring to FIGS. 5, 6, and 7, I will describe another embodiment of my novel fastening means. In some ways, this embodiment would be preferred over the embodiment shown in FIGS. 2, 3, and 4. In this embodiment, the crossmembers 14 and 15 are each respectively made of two channel iron elements 117 and 118 disposed back-to-back as shown with element 118 within element 117, forming a tubular form. Both elements 118 are pin-mounted to member 11 by the pins 19 and both elements 117 and pin-mounted to member 12 also by the pins 19.

In this embodiment, although elements 117 and 118 overlap, they do not require an elaborate means 21 as described in the above described embodiment. As shown in FIG. 5, element 118 is provided with a series of teeth 135 each formed by a sloping face 136 and a vertical face 137. Engaging the teeth 135 is a pawl 141 pivotably mounted to the element 117 by a pin 142 and arm 143 to which the pawl 141 is attached. A tab 144 extends from pawl 141, as shown in FIG. 6, to provide a place for a person to operate the pawl 141. The tab 144 extends through an opening 151 formed in channel 117. The operation of this embodiment is substantially the same as the first described embodiment.

Having described two embodiments of my invention, one skilled in the art, after reading the above description, could devise other embodiments without departing from the scope and spirit of my invention. Therefore my invention is not to be considered as limited to the disclosed embodiment, but includes all embodiments falling within the scope of the appended claims.

I claim:

1. In an adjustable bed frame adapted to support a box spring and mattress, a pair of spaced parallel [horizontal] *horizontally* disposed side frame members;

at least one horizontally disposed transverse frame member comprising two elongated elements;

one of said elements mounted by one of its ends to one of said side frame member and the other of said elements mounted by one of its ends to the other of said side frame members;

said other element having a series of teeth disposed substantially along its length;

a spring-loaded pawl mounted on said one element [near its free end];

said one element and said other element being disposed in slidable relationship to each other so that said pawl engages said teeth one at a time, *said teeth facing in a direction such that said pawl is free to ride over said teeth when said side frame members are moved inwardly toward one another, engagement between said pawl and one of said teeth preventing said side frame members from moving outwardly relative to one another.*

2. In the frame of claim 1:

said teeth are shaped so that said members are locked in one direction and are free to move in the other direction.

3. In the frame of claim 1:

said elements each has a right angle shaped cross-section;

said sleeve has a right angle shaped opening;

said sleeve is mounted to said one element so that both legs of said one element are adjacent to the interior of said sleeve;

said other element has said series of teeth formed on the lower edge of the respective leg forming the angle shape;

an arm is pivotably mounted on the side of said sleeve so that said arm pivots about an horizontal axis and extends substantially horizontal along said sleeve.

4. In the frame of claim 3:

said sleeve has an opening formed in its lower portion to expose said teeth;

said pawl extends into said opening to engage said teeth.

5. In the frame of claim 4, said teeth are shaped so that said elements move freely in one direction and are locked from moving in the other direction.

6. In the frame of claim 1:

said elements each has a channel shaped cross-section wherein one element is of a size to slip into the other element of said same transverse frame member;

said channel elements of said same transverse frame member are disposed back-to-back to form a tubular enclosure;

said inner channel elements has a series of teeth formed thereon; and a pawl pin-connected on said outer channel element and disposed to engage said teeth.

7. In the frame of claim 6:

said outer channel member has an opening formed near said pawl;

a tab formed on said pawl and disposed to extend through said opening.

8. In the frame of claim 7, said teeth are shaped so that said elements move freely in one direction and are locked from moving in the other direction.

*9. In the frame of claim 1, said pawl being provided near the free end of said one element.*

*10. In the frame of claim 1, wherein said teeth are provided along a short segment of the length of said other element.*

*11. In the frame of claim 1, wherein said other element includes a wall defining an opening, and said teeth are provided along the edge of said wall and project into said opening.*

*12. In the frame of claim 1, wherein each of said elements has a generally C-shaped cross-sectional shape, and said wall is a flange on said other element and forming part of said C.*

* * * * *